United States Patent

[11] 3,615,172

| [72] | Inventor | Franklin Charles Fulson<br>Lewiston, N.Y. |
|---|---|---|
| [21] | Appl. No. | 798,804 |
| [22] | Filed | Feb. 12, 1969 |
| [45] | Patented | Oct. 26, 1971 |
| [73] | Assignee | NL Industries, Inc.<br>New York, N.Y. |

[54] PREPARATION OF CRYSTALLINE CARBONATOZIRCONATES OF AMMONIUM AND POTASSIUM
7 Claims, No Drawings

[52] U.S. Cl. ................................................. 23/22, 23/51, 23/61
[51] Int. Cl. ................................................. C22b 59/00, C01g 25/00
[50] Field of Search ..................................... 23/22, 51, 61

[56] References Cited
UNITED STATES PATENTS

| 2,507,128 | 5/1950 | Wainer | 23/61 UX |
| 2,444,913 | 7/1948 | Bond | 23/51 UX |
| 2,641,558 | 6/1953 | Urban et al. | 23/51 X |
| 3,418,073 | 12/1968 | Blumenthal | 23/51 X |
| 3,510,254 | 5/1970 | Bell | 23/22 |

*Primary Examiner*—Herbert T. Carter
*Attorney*—Ashlan F. Harlan, Jr.

ABSTRACT: Ammonium or potassium carbonatozirconate is prepared as a crystalline, water-soluble product by the reaction, in a liquid medium consisting essentially of a lower aliphatic alcohol and a minor amount of water, of a water-soluble zirconium chloride and the carbonate or bicarbonate of the alkali.

PREPARATION OF CRYSTALLINE CARBONATOZIRCONATES OF AMMONIUM AND POTASSIUM

BACKGROUND OF THE INVENTION

This invention relates to alkali carbonatozirconates, specifically the carbonatozirconates of ammonium and potassium, and is particularly concerned with a novel and convenient process for producing such compounds in crystalline form.

According to prior practice, alkali carbonatozirconates have been produced in solution. Recovery of the products as crystalline solids from such solutions has required expensive materials or tedious procedures which have been regarded as excessively costly. Consequently, for commercial use, alkali carbonatozirconates have usually been shipped and sold in solution, with the greater expense thus necessitated, instead of in dry, crystalline form.

SUMMARY OF THE INVENTION

According to the novel process of the present invention, a crystalline, water-soluble carbonatozirconate of ammonium or potassium is produced directly by mixing, in a liquid medium consisting essentially of a lower aliphatic alcohol and a minor amount of water, a water-soluble zirconium chloride and the carbonate or bicarbonate of the appropriate alkali, filtering the slurry to remove the carbonatozirconate formed, and drying the product.

DESCRIPTION OF THE PREFERRED EMBODIMENT

EXAMPLE 1

32.3 grams (0.1 gram mol) of zirconyl chloride octahydrate is dissolved in approximately 200 ml. of ethanol containing about 5 Vol. % $H_2O$ at room temperature (20°–30° C.) and filtered to remove insoluble impurities. 48.1 grams (0.5 gram mol) of ammonium carbonate is stirred into the filtrate which rapidly thickens as gel formation takes place. The mixture is stirred while diluting it with an additional 500 ml. of the $H_2O$-containing ethanol. Thus the reacting mixture contains approximately 522 g. of ethanol and 35 g. of water in addition to the water in the zirconyl chloride octahydrate. The total water present is approximately 49.4 g. or a mol ratio of $H_2O$ to Zr of 27.4. The stirring is continued for 1 hour to break up and disperse the gel and permit the formation of crystalline ammonium carbonatozirconate. The dispersion is filtered and the solid product is washed with ethanol and dried at room temperature.

The resultant ammonium carbonatozirconate product is a soft, white powder readily soluble in water up to about 30 g. per 100 ml. of water at room temperature.

Other embodiments of the invention, including the use of other lower aliphatic alcohols are set forth in the following examples.

EXAMPLE 2

32.3 grams (0.1 gram mol) of zirconyl chloride octahydrate is dissolved at room temperature in 200 ml. of ethanol containing about 5 vol. % $H_2O$. After filtering the solution, 39.6 grams (0.5 gram mol) of ammonium bicarbonate is added to the filtrate and stirred while it is diluted with 500 ml. of the $H_2O$-containing ethanol, the stirring being continued for 1 hour to disperse the gel formed and permit formation of crystals of ammonium carbonatozirconate. As in example 1, the reacting mixture contains approximately 522 g. of ethanol and a total of approximately 49.4 g. of $H_2O$, corresponding to a mol ratio of $H_2O$ to Zr of 27.4. The solid product is removed by filtering, and after washing with ethanol is dried at room temperature.

As in example 1, a soft, white, water-soluble ammonium carbonatozirconate product is obtained.

EXAMPLE 3

A solution of 32.3 grams (0.1 gram mol) of zirconyl chloride octahydrate is made at room temperature in 200 ml. of methanol containing about 5 vol. % $H_2O$. Insolubles are filtered off and 48.1 grams (0.5 gram mol) of ammonium carbonate is stirred in. An additional 500 ml. of the $H_2O$-containing methanol is then added to the gel that forms so that the reacting mixture contains approximately 526 g. of methanol and a total of approximately 49.4 g. of water. Stirring is continued for about 6 hours. The resultant crystalline product is removed by filtering, washed with methanol, and dried at room temperature to obtain soft, white, water-soluble ammonium carbonatozirconate.

EXAMPLE 4

To a solution at room temperature of 32.2 g. (0.1 mol) of zirconyl chloride octahydrate in 200 ml. of ethanol containing about 5 vol. % of $H_2O$ there is added, after filtering, 34.55 g. (0.25 gram mol) of potassium carbonate and an additional 500 ml. of the $H_2O$-containing ethanol is stirred in. The resulting mixture which contains approximately 522 g. of ethanol and a total of approximately 49.4 g. of water, gels and stirring is continued for 5 hours to break up the gel and thoroughly mix the reactants. The resulting product is filtered off, washed with ethanol, and dried. It is a soft, white, crystalline, water-soluble potassium carbonatozirconate.

EXAMPLES 5 and 6

In these examples essentially the same procedure and materials are used as in example 4. However, in example 5 the amount of potassium carbonate used is only 29.01 g. (0.21 gram mol) and in example 6 only 27.64 g. (0.20 gram mol) of potassium carbonate is used. The results are quite similar to those in example 4.

EXAMPLE 7

18.3 g. (0.078 gram mol) of zirconium tetrachloride is mixed with 67.5 g. (0.703 gram mol) of ammonium carbonate, 128 ml. of 2-propanol, and 11 ml. of water. To the resultant gel is added, with stirring to disperse the gel, an additional 350 ml. of 2-propanol. The stirring is continued for 6 hours. The product, crystalline ammonium carbonatozirconate, is removed by filtering and washed with 2-propanol, then dried under reduced pressure at 20–30° C. The dried product is substantially like that of examples 1 2.

As will be seen from the foregoing examples, various aliphatic alcohols can be used in carrying out the process of the present invention. By the term "lower aliphatic alchohol" as used herein is meant methyl, ethyl, n-propyl, and isopropyl alcohols. It will be understood that there is no particular advantage to one of these alcohols over another. Consequently, the alcohols used will ordinarily be chosen on the basis of availability, price, and volatility. The latter may be important when drying the product.

The alcohol serves as a solvent for the zirconium chloride and reaction medium. The quantity used is not critical, enough being used to dissolve the zirconium chloride and give a reaction mix of such consistency as to be conveniently stirred. The presence of water in the reaction mixture is necessary and the mol ratio of water to zirconium in the mixture should be at least 7.5:1. Although in view of the water solubility of the alkali carbonatozirconates, the amount of water used should be restricted, a mol ratio of $H_2O$: Zr as great as 28: 1 may be employed.

The atomic ratio of alkali to zirconium in the reacting mixture preferably is within the range from 10:1 to 4:1. Although excess alkali tends to dilute the product and less alkali tends to cause a reduction in the yield, atomic ratios in the range from 14:1 to 5:1 may be used in producing the ammonium product and 6:1 to 3:1 in producing the potassium product. As seen from the foregoing examples, either the alkali carbonates or bicarbonates can be employed. In the appended claims the term "carbonate" is intended to include the corresponding bicarbonate.

Generally, zirconium oxychloride or zirconyl chloride is the most convenient zirconium chloride to use in carrying out the novel process disclosed herein. However, if desired, zirconium tetrachloride may be used as a starting material and the excess acidity resulting from its reaction with water may be neutralized with ammonia or other suitable base.

Although the speed of the reactions is slow, they can be carried out at ambient or room temperature (20°–30° C.) and this is preferred in producing ammonium carbonatozirconate. In preparing potassium carbonatozirconate, temperatures up to 50° C. are satisfactory since there is no tendency toward decomposition of the potassium product at that temperature.

The alkali carbonatozirconates made by the present invention are completely soluble in water, not only when first made, but also after standing in a sealed container for 3 months or more. The instability of alkali carbonatozirconate solutions in storage, which has hitherto been troublesome, is thus obviated as a problem.

Zirconium always occurs in nature associated with a small fraction of hafnium. Since the chemical properties of these elements are more similar than those of any other two elements and they are therefore separated only with great difficulty, practically all zirconium compounds contain a small amount of the analogous hafnium compound. Consequently, it will be understood that the invention of this application is also effective to produce crystalline alkali carbonatohafnates as well as mixtures thereof with alkali carbonatozirconates. It should be noted that for most purposes the associated hafnium salts are not considered as impurities in zirconium salts.

Except as otherwise indicated, in the foregoing description and the accompanying claims, parts, proportions, and ratios are based on weights.

I claim:

1. A process for directly producing crystalline ammonium or potassium carbonatozirconate which comprises mixing together a water-soluble zirconium chloride and a carbonate of the alkali in a liquid medium consisting essentially of an alcohol selected from the group consisting of methyl, ethyl, n-propyl and isopropyl alcohols and water in an amount such that the mol ratio of water to zirconium is from 7.5:1 to 28:1 filtering off the resultant reaction product, and drying said product.

2. A process as set forth in claim 1 in which the reaction product is washed with said alcohol before drying.

3. A process as set forth in claim 1 in which the atomic ratio of alkali to zirconium is in the range from 10:1 to 4:1.

4. A process as set forth in claim 1 in which the alkali is ammonium and the atomic ratio of alkali to zirconium is in the range from about 14:1 to 5:1.

5. A process as set forth in claim 4 in which the reaction product is washed with said alcohol before drying.

6. A process as set forth in claim 1 in which the alkali is potassium and the atomic ratio of alkali to zirconium is in the range from about 6:1 to 3:1.

7. A process as set forth in claim 6 in which the reaction product is washed with said alcohol before drying.

* * * * *